United States Patent [19]

Horn

[11] Patent Number: 4,758,061
[45] Date of Patent: Jul. 19, 1988

[54] METHOD AND APPARATUS FOR CONVERGING THE ENDS OF TWO LIGHT WAVEGUIDES

[75] Inventor: Joachim Horn, Germering, Fed. Rep. of Germany

[73] Assignee: Siemens Aktiengesellschaft, Berlin and Munich, Fed. Rep. of Germany

[21] Appl. No.: 845,833

[22] Filed: Mar. 28, 1986

[30] Foreign Application Priority Data

Apr. 23, 1985 [DE] Fed. Rep. of Germany ....... 3514647

[51] Int. Cl.⁴ .............................................. G02B 6/26
[52] U.S. Cl. ............................. 350/96.15; 350/96.10; 350/96.20
[58] Field of Search ................. 350/96.15, 96.20, 96.21

[56] References Cited

U.S. PATENT DOCUMENTS

| | | | |
|---|---|---|---|
| 3,960,531 | 6/1976 | Kohanzadeh et al. | 350/96.21 |
| 4,049,414 | 9/1977 | Smith | 350/96.21 X |
| 4,248,499 | 2/1981 | Liertz et al. | 350/96.21 |
| 4,274,707 | 6/1981 | Pacey et al. | 350/96.20 |
| 4,319,902 | 3/1982 | Hensel | 350/96.21 X |
| 4,452,506 | 6/1984 | Reeve et al. | 350/96.20 |
| 4,544,234 | 10/1985 | DeVeau, Jr. et al. | 350/96.21 |
| 4,548,630 | 10/1985 | Biedka | 350/96.21 X |
| 4,561,719 | 12/1985 | Quan | 350/96.21 |
| 4,645,292 | 2/1987 | Sammueller | 350/96.21 |

FOREIGN PATENT DOCUMENTS 2100463 12/1982 United Kingdom .
2144239 2/1985 United Kingdom .

Primary Examiner—William L. Sikes
Assistant Examiner—Akm E. Ullah
Attorney, Agent, or Firm—Hill, Van Santen, Steadman & Simpson

[57] ABSTRACT

In a method for converging the ends of two light waveguides, light energy is coupled into one light wave guide and a portion thereof is coupled out of the other light waveguide. This in and out coupling of the light is undertaken during the axial displacement of one of the light waveguides, whereby the light energy coupled out is continuously measured during the axial displacement. A control signal which is employed for terminating the longitudinal displacement is derived from the discontinuous change in the wave form of the measured light energy coupled out, which discontinuous change occurs at the time of contact between the end faces of the two light waveguides.

10 Claims, 4 Drawing Sheets

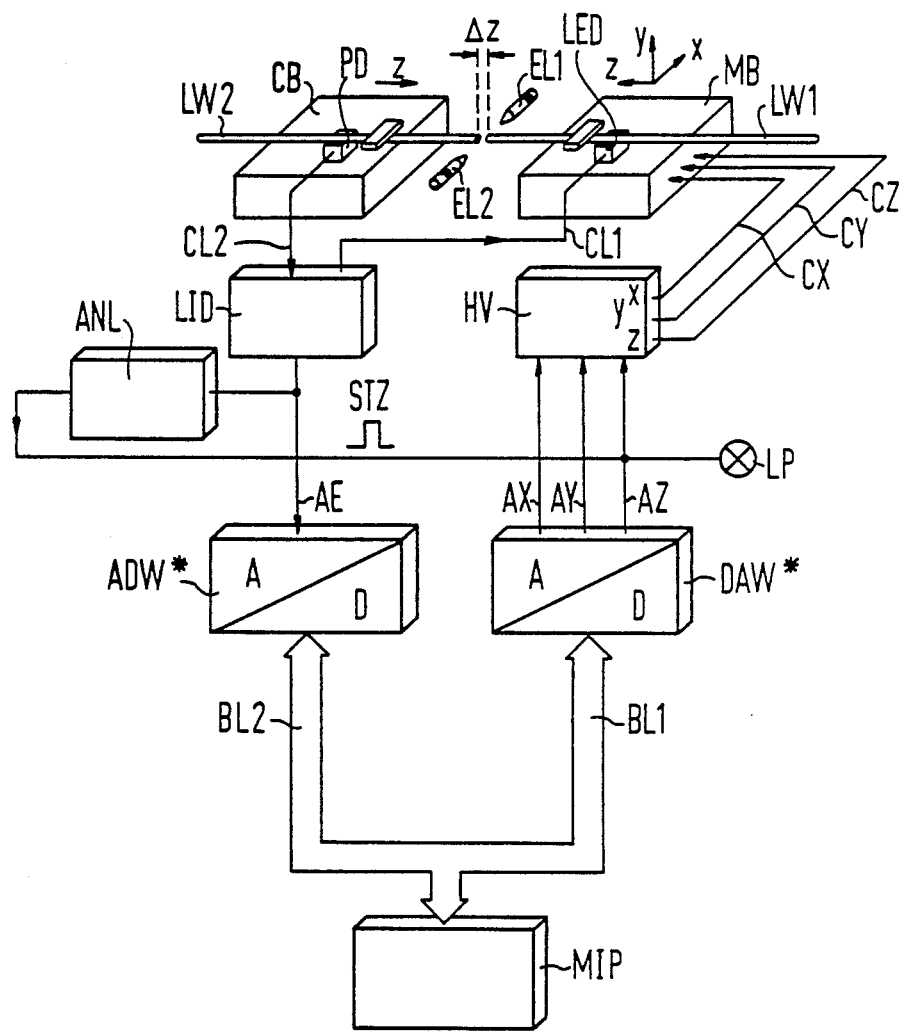

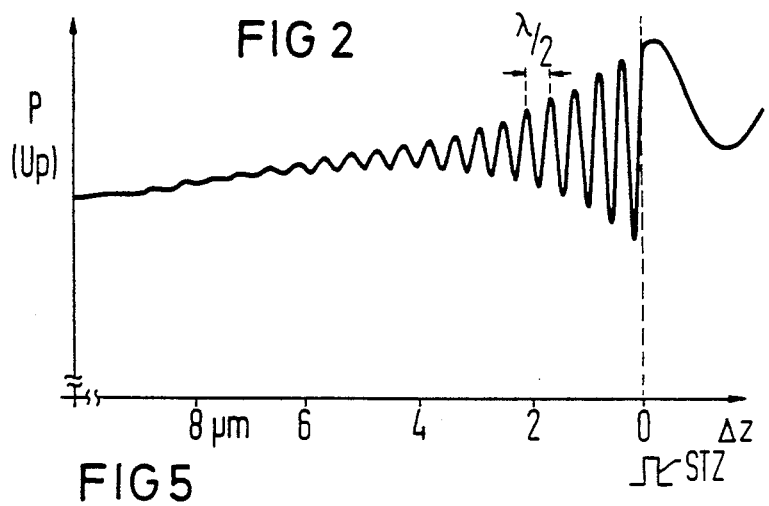
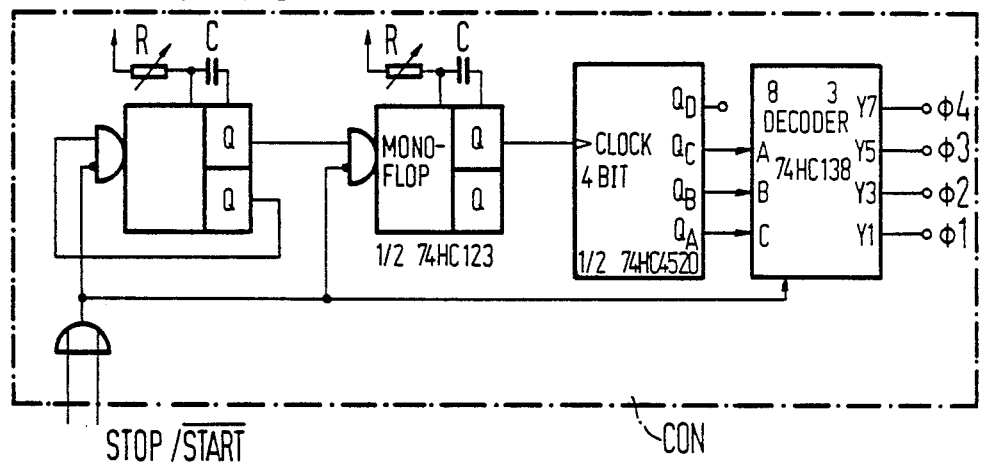
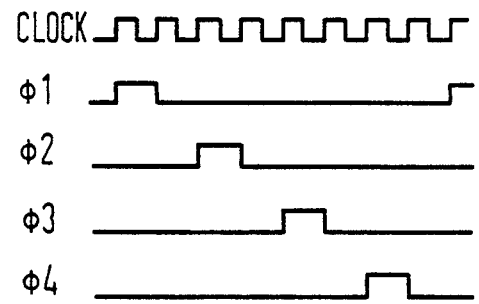

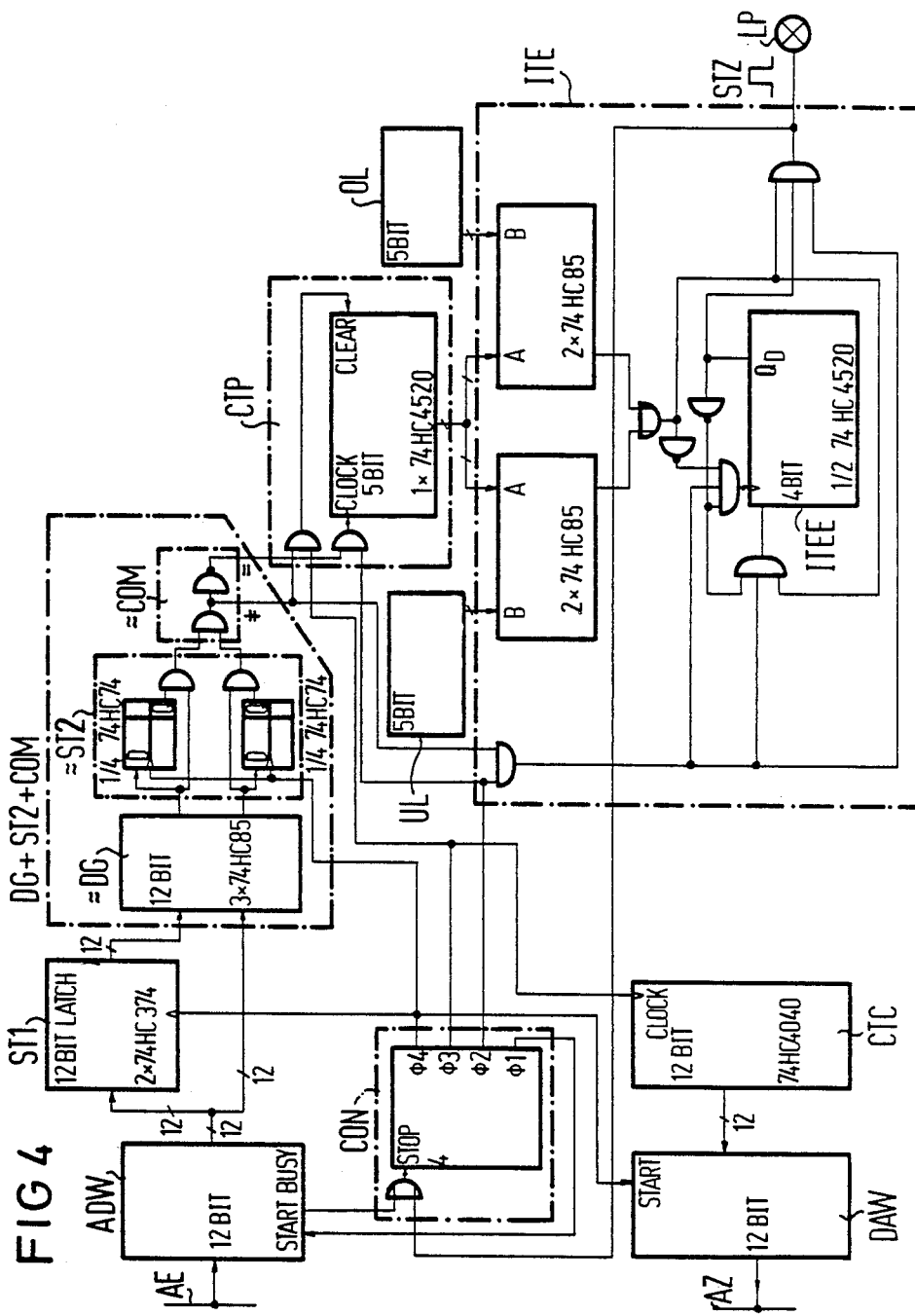

METHOD AND APPARATUS FOR CONVERGING THE ENDS OF TWO LIGHT WAVEGUIDES

BACKGROUND OF THE INVENTION

1. Field of the Invention

The present invention relates to a method and to an apparatus for converging the ends of two light waveguides in the axial direction, whereby light energy is coupled into the one light waveguide and a portion thereof is coupled out of the other light waveguide.

2. Description of the Prior Art

A method of the general type set forth above is disclosed, for example, in European patent No. 00 30 108 corresponding to U.S. Pat. No. 4,452,506, fully incorporated herein by this reference. In addition to radial alignment (x-direction and y-direction) of the light waveguides, the problem always arises that an axial dislocation (in the z-direction) must also be undertaken, namely until the two light waveguides mechanically abut one another or, respectively, have a prescribed, extremely small spacing of only a few μm therebetween. In this context, there is the possibility of observing the ends of the two light waveguides approaching one another and terminating the displacement operation given adequate convergence. This method is relatively time-consuming and inaccurate.

SUMMARY OF THE INVENTION

The object of the present invention is to improve the method of the type generally set forth above such that it functions as reliably and accurately as possible and allows realization with a relatively small expense.

In a method of the general type set forth above, this object is achieved, according to the present invention, in that the in and out coupling of the light is undertaken during the actual displacement of at least one of the light waveguides, in that the light energy coupled out during axial displacement is continuously measured, and in that a control signal, which is utilized for terminating the longitudinal displacement, is derived from the discontinuous change in the chronological curve of the measured light energy coupled out, this discontinuous change occurring at the time of end face contact between the two light waveguides.

The present invention is based on the perception that the measured signal which is generated during the axial convergence of the light waveguides experiences and a noticeable and, therefore, essentially interpretable discontinuous change at the time of contact between the end faces. It is thereby possible, in fact, to bring the ends of the light waveguides into contact with one another, but to thereby avoid damage to the optimally planar and exactly cut end due for example, to excessive forces. An unequivocal and arbitrarily reproducible criterion for the time of contact between the two light waveguides is therefore available, according to the present invention, which can be relatively easily interpreted and remains useable regardless of the type of light waveguides employed or other environmental conditions. The method of the invention is particularly suitable for automated operation in that all of the events can be easily acquired with test methods and, therefore, the formation of the control signal can be undertaken with corresponding accuracy.

The invention also relates to an apparatus for implementing the method using a displacement guide for the axial motion of one of the light waveguides and a measuring instrument for the light energy coupled out, which is characterized in that the measuring instrument has an analysis device assigned thereto which identifies the appearance of the discontinuous change of the light energy coupled out and generates the control signal, and is further characterized in that the control signal is fed from the analysis device to the axial displacement guide to cause termination of axial displacement.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a schematic representation of the basic structure of an apparatus constructed in accordance with the present invention;

FIG. 2 is a graphic illustration of the light energy coupled out, dependent on the distance between the ends of the light waveguides;

FIG. 4 is a block circuit diagram showing the structure of FIG. 3 in greater detail;

FIG. 5 is a block circuit diagram of the circuit for editing the phase clock; and FIG. 6 is a timing schedule for the pulses employed in practicing the invention.

DESCRIPTION OF THE PREFERRED EMBODIMENTS

Figure 3:
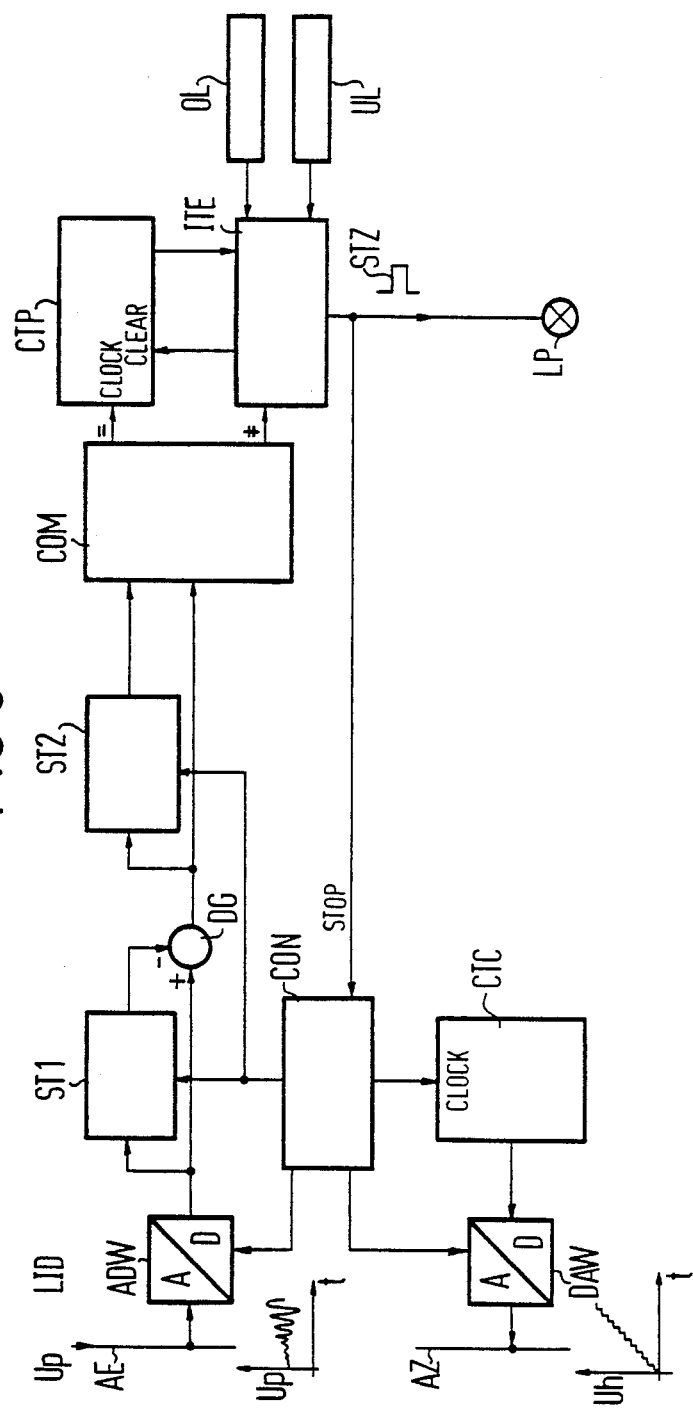
FIG. 3 is a block circuit diagram of a circuit for performing the signal analysis of the received signal of the light power coupled out.

Referring to FIG. 1, two light waveguides LW1 and LW2 are to be connected to one another and are respectively secured in appropriate mounts MB and CB. The mount MB is constructed in a known manner such that it allows a movement of the light waveguide LW1 in the direction of the three coordinate axes x, y and z. In detail this can be accomplished by known adjustment elements, particularly piezo adjustment elements, which are located in the region of the mount MB. Three lines CX, CY and CZ are provided for actuation of the adjustment elements and extend from a corresponding device for high-voltage supply HV, given piezo elements. The control instructions for the high-voltage supply arrive via control lines AX, AY and AZ, from a digital-to-analog converter DAW* which is in communication with a microprocessor MIP via a bus line BL1.

On the drawing, a corresponding gap, whose width is referenced Δz exists between the end faces of the two light waveguides LW1 and LW2. It is assumed in the present example that a welded connection is to be produced by way of two welding electrodes EL1 and EL2 after the alignment of the light waveguides LW1 and LW2 has been accomplished. However, it is also possible to employ the invention in the context of other types of connection, for example by way of sleeve-shaped connecting arrangements or connecting arrangements functioning with adhesive.

In order to be able to continuously check the alignment of the light waveguides LW1 and LW2, an optical transmitting and receiving device LID (light injection and detection) is provided which supplies electrical signals (at a wavelength of about 850 nm) via a first connecting line CL1 to a light-emitting diode LED which couples the light energy into the light waveguide LW1 via an appropriate coupling device. Dependent on the precise alignment of the x and y coordinates within the manipulatable mount MB, a corresponding portion of the light coupled in proceeds into the light waveguide LW2 and is coupled out thereof via a further coupling device and supplied to a photodiode PD. The photodiode PD converts the received light energy into a voltage which is, in turn, supplied to the optical transmitting and receiving device LID via a line CL2. In the present example, which shows a digitally operating splicing device for monomode fibers, for example, the output signals of the optical transmitting and receiving device LID are supplied to an analog-to-digital converter ADW* which is in communication with the microprocessor MIP via a bus line BL2. The microprocessor generates setting signals for the displacement of the light waveguide LW1 in the x and y directions until the light energy received by the photodiode PD reaches a maximum. In this case, the fiber cores of the two light waveguides LW1 and LW2 are in direct alignment.

The arrangement set forth up to now corresponds to the structure of known splicing devices in terms of the analog portion i.e. without the analog-to-digital converter ADW*, the digital-to-analog converter DAW* and the microprocessor MIP, such as, for example, the devices S 46 999-M7-A15 and S 46 999-M7-S52 of the Siemens Company.

In order to identify the time at which the end faces of the two light waveguides LW1 and LW2 abut against one another, i.e. when the spacing $\Delta z=0$, FIG. 1 illustrates an operating circuit which is coupled to the output line AE of the optical transmitting and receiving circuit LID, the operating circuit referenced ANL and being hereinafter termed the evaluation circuit. As shall be set forth in greater detail with reference to FIG. 2, the time at which the distance $\Delta z$ between the end faces of the light waveguides becomes zero can be accurately determined by evaluation of the received signal generated via the photodiode PD and transmitted via the line CL2, this signal corresponding to the light energy that is coupled out. At this time, the evaluation circuit ANL generates a control signal STZ which is supplied to the high-voltage supply HV, i.e. to that portion that is responsible for the displacement of the light waveguide LW1 in the direction of the z axis. At the moment of the appearance of this control signal (whose leading edge simultaneously corresponds to the time of contact between the end faces of the two light waveguides), the longitudinal displacement of the light waveguide LW1 in the z direction is terminated, whereby it is assured that the ends of the light waveguides LW1 and LW2 in fact touch, but no impermissible high forces occur and, therefore, damage to the end faces is avoided. It is also possible for the condition $\Delta z=0$ to be displayed to the operator, for example by a lamp LP and/or an acoustical signal. This display is indispensable when the longitudinal displacement in the z direction is to occur by way of hand operation.

FIG. 2 illustrates the light energy P coupled out which is picked up by the photodiode PD or, respectively, the voltage $U_p$ derived therefrom and transmitted to the receiving circuit LID via the line CL2, being shown, in particular, dependent on the magnitude of the distance $\Delta z$ between the end faces of the light waveguides LW1 and LW2. The wavelength of the light supplied by the optical transmission device LID thereby amounts to $\lambda=850$ nm. When the curve up to the point of contact at $\Delta z=0$ is observed, then it may be found that this exhibit roughly the waveform of a building up oscillation, whereby investigations have shown the distance between two amplitude maximums is $\delta\lambda/2$. This course of the curve form can be explained in roughly the following manner on the basis of interference phenomena.

The light is coupled from the light waveguide LW1 into the light waveguide LW2, whereby a certain portion (on the order of 3–5%) is reflected at the end face of the light waveguide LW2. This reflected portion contains a phase jump of $\lambda/2$ and is reflected back in the direction towards the light waveguide LW1. It thereby interferes with the forward portion of the light oscillations and thereby supplies a defined resultant light amplitude value for every distance value $\Delta z$. As viewed over the time of the overall moving event, a type of "modulation" derives dependent on the distance $\Delta z$ between the fiber end faces. Given uniform feed rate in the z direction, the "modulation" of the received signal or, respectively, the voltage $U_p$ has a relatively precisely defined frequency so that the axis referenced $\Delta z$ in FIG. 2 can also be viewed as a time axis. The majority portion of the reflected light (between 95 and 97%) proceeds into the light waveguide LW1. The small portion again reflected at the end face of the light waveguide LW1 is already so insignificant that its influence can be neglected.

The amplitude values of the light energy coupled out are modulated in a more and more pronounced manner the closer the ends of the light waveguides LW1 and LW2 come to one another, whereby the interference phenomena in the air gap cease immediately at the point in time of contact because such an air gap is no longer present. After the point $\Delta z=0$, the curve has a completely different course and the periodicity with $\lambda/2$ from amplitude maximum to amplitude maximum with respect to the wavelength employed is completely lost.

There is therefore the possibility of continuously evaluating the received light energy which the photodiode converts into electrical voltage $U_p$, evaluating the same such that the time at which the periodicity is lost is identified, this corresponding to the time at which the end faces of the light waveguides LW1 and LW2 touch. At this time, a control signal STZ is generated in the form of a pulse, for example, which or, respectively, whose leading edge is used to immediately stop (via the high-voltage supply means) the further drive (i.e. the further increase of the setting voltage) of the piezo element which determines the displacement in the z direction. The consequence of this is that, immediately after contact of the two light waveguide end faces, the same are held in the position thus achieved, i.e. in a position at which the two end faces just touch without exerting an excessively-high force against one another, so that any and all damage or dislocation is avoided.

Suitable for the evaluation of the received signals $U_p$ coupled out which are supplied by the photodiode PD are all circuits which allow a sudden frequency change of a modulation to be recognized and the be marked by generating a signal corresponding to the control pulse STZ. In particular, all types of fast frequency discriminators can be employed, as can all types of circuits which, for example, acquire amplitude extremes occurring at a specific time spacing (corresponding to $\lambda/2$) and compare them to one another. Given a continuous feed rate in the z direction, the time spacing between successive extreme values must thereby remain constant up to the point $\Delta z=0$. Thereafter, this value changes fundamentally can therefore be easily evaluated, as an analysis of the curve of FIG. 2 clearly illustrates.

The utilization of a narrow band filter circuit is also conceivable, the filter circuit being tuned to the "modulation frequency". This frequency ends at a point $\Delta z=0$ and the previously existing signal therefore disappears from the output of the filter. The trailing edge of this output signal would then be the control criterion for the conclusion of the displacement in the Z direction.

FIG. 3 illustrates a block circuit diagram of an arrangement which permits the identification of the point of contact to be executed with particular accuracy. It is thereby assumed that the signal evaluation occurs digitally (in contrast to the analog presentation of FIG. 1). The analog-to-digital converter ADW corresponds to the circuit shown in FIG. 1 and referenced ADW*. The received voltage $U_p$ supplied by the photodiode PD is supplied to the input terminal of the analog-to-digital converter ADW. The circuit shown in FIG. 3 operates as a clocked circuit ("switching device"), whereby the clock supply occurs from a sequence controller CON. The clock signals are fed to the analog-to-digital converter ADW as well as to the two memories ST1 and ST2 and also to the digital-to-analog converter DAW (to be set forth later) and to a counter CTC. The output signal of the analog-to-digital converter is supplied, without delay, to a differentiator DW and is also supplied to the second input of the differentiator DG delayed by one clock period. In the region of rising voltage values $U_p$ of FIG. 2, the value formed in the differentiator DW is positive, whereas negative values appear given descending amplitudes. The difference obtained, therefore, at the output of the differentiator DG is supplied to an operational sign comparison circuit COM, being supplied thereto, first, directly and, also, delayed by a clock period via a memory ST2. Values having the same operational sign are always applied to the two inputs of the operational sign comparison circuit COM in the region outside of the extreme values of the voltage Up of FIG. 2. Beginning at the moment in which identical operational signs appear at the inputs of the comparison circuit COM, a period duration counter CTP is driven, thus respectively counting until the voltage Up of FIG. 2 proceeds from one extreme value to the next extreme value (i.e. from a maximum to a minimum or from a minimum to a maximum), where a change of operational sign respectively occurs. The count value thereby reached is supplied to an interval tester ITE which contains a generator OL for the upper limit and a generator UL for the lower limit of the count values which can be achieved on the basis of the respective arrangement. When, for example, the clock frequency is selected such that a count up to 20 can be carried out from one extreme to the other given the respective feed rate for the light waveguide, then the upper limit would be set, for example, to the value 22 and the lower limit would be set to the value 18. All values which lie within this tolerance range from the count value 18 up to the count value 22 would be viewed as count values of the modulation before the point of contact between the light waveguide fibers LW1 and LW2 and a control signal STZ would therefore not be output.

As may be seen from FIG. 2, the "modulation" of the voltage Up proceeds entirely differently after reaching the point of contact, namely at a considerably lower frequency in the present example. However, it is also possible that a jump to a higher-frequency modulation will occur. This would mean that the period duration counter CTP for the values assumed above would, for example, not count only to 20, but for example, would count to 26 before a new change of operational sign occurs. Given a jump to a higher-frequency modulation, for example, counting could only be carried out up to 5. The count value thus obtained would indicate that contact between the end faces of the fibers has occurred in the meantime and the control signal STZ would therefore be output, this effecting a standstill of the feed for the light waveguide fiber LW1 and also being capable of being displayed by the display device LP.

In order to suppress the undefined conditions in the startup region, an auxiliary counter ITEE is provided within the interval tester ITE. After the start of the operation, the auxiliary counter ITEE is always counted up when an extreme lies within the limit values supplied by the generators OL and UL and is erased when the extreme lies outside of the value supplied by the generators OL and UL. When the auxiliary counter ITEE reaches a defined value (in the circuit of FIG. 4, the value 4, hardwired), i.e. when for example an extreme occurs 4 times in succession within the values of the generators OL, UL, then the operation can be considered to be in its steady state. The auxiliary counter is arrested. Only thereafter can the signal STZ appear.

The control signal STZ, namely precisely the leading edge thereof, proceeds to the sequence controller CON as a stop signal and stops the latter, i.e. no further signal evaluation occurs from this point on. Simultaneously, the counter CTC controlled by the sequence controller CON is likewise stopped therewith. This counter CTC, which stands at zero at the beginning of the convergence operation, is connected to the digital-to-analog converter DAW and supplies the step-shaped rising voltage Uh to the output thereof which is fed into the control line AZ and which serves the purpose of readying the high-voltage in the high-voltage supply HV of FIG. 1 serving for the displacement in the z direction given a piezo electric control element. When the point of contact at $\Delta z=0$ is reached, therefore, the voltage Uh is also held at the value it has reached, so that the piezo displacement element for the z direction holds the light waveguide LW1 in the position received upon contact. Subsequently, the splicing event can occur, for example by way of the two electrodes EL1 and EL2 of FIG. 1. After resetting all elements, the circuit is then prepared for the splicing operation of two new light waveguides.

FIG. 4 illustrates a possibility for the design of the block circuit diagram of FIG. 3, whereby the reference characters employed therein have been taken over thereto for the individual assemblies.

The details of the circuit structure for the sequencer controller CON are illustrated in FIG. 5, whereas FIG. 6 illustrates the course of the pulses $\phi 1-\phi 4$ of the decoder of FIG. 5 and, therefore, shows the phase relation of the various control signals.

In accordance with the clock pulses $\phi 1-\phi 4$, the following structogram derives for the function of the circuit arrangement.

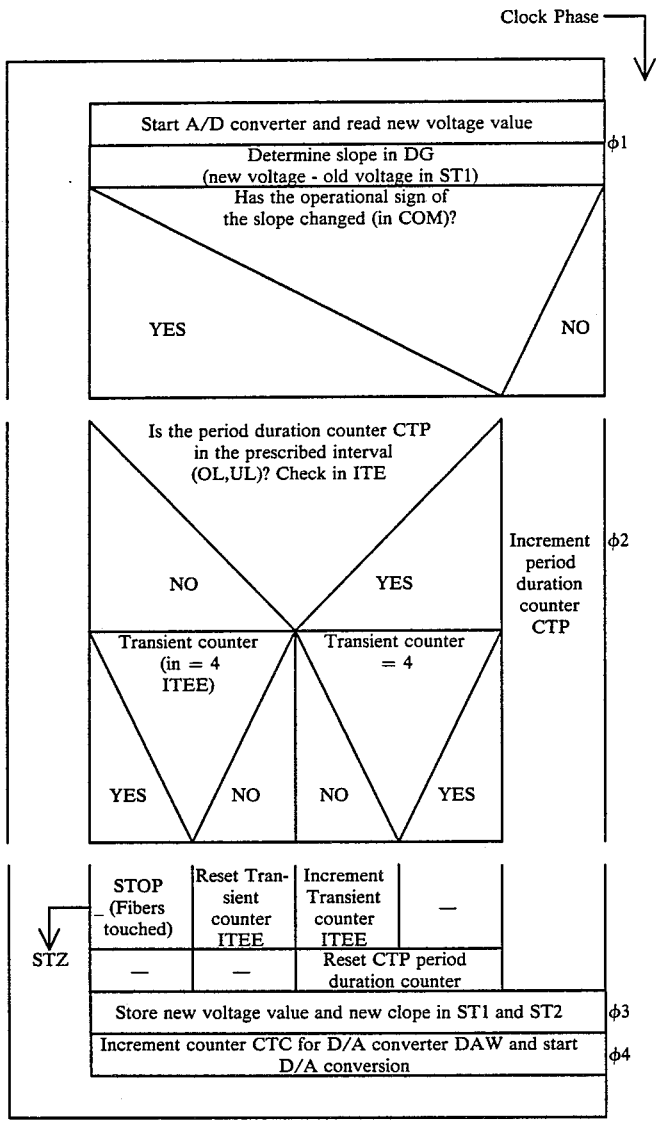

Structogram of the Function of the Circuit

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method for converging the ends of first and second axially-aligned light waveguides, comprising the steps of:

coupling light into the first waveguide and coupling a portion of the light out of the second light waveguide while axially moving at least one of the light waveguides toward the other and causing a continuous change in the light coupled out of the second light waveguide;

continuously measuring the light coupled out of the second light waveguide;

wherein the step of coupling light into the first light wave guide further includes the step of modulating the light by interference in the air gap between the end faces of both light waveguides with reflected light from the end of the second light waveguide;

said interference supplying a defined resultant light amplitude value in the continuously measured light coupled out of the second light waveguide over the time of the overall moving event, the modulation derives being dependent on the distances between the end faces of the fibers; and terminating movement upon measuring a discontinuous change in the modulation of the measured light which represents contact of the ends of the first and second light waveguides.

2. The method of claim 1, wherein:

the step of moving is further defined as moving at least one of the light wave guides while controlling that movement;

the step of continuously measuring the light coupled out of the second light waveguide is further defined as generating a control signal upon measuring a discontinuous change of the measured light; and further comprising the step of applying the control signal to the control to terminate movement.

3. The method of claim 2, wherein:

the step of measuring is further defined as measuring the light coupled out of the second light waveguide and generating the control signal in response to measurement of an unsteady location of the measured light.

4. The method of claim 2, wherein:

the step of measuring is further defined as measuring the amplitude change of the measured light coupled out of the second light waveguide.

5. The method of claim 2, wherein:

the step of measuring is further defined as measuring the frequency change of modulation of the measured light coupled out of the second light waveguide.

6. The method of claim 1, wherein the steps of measuring the light and generating the control signal are further defined as:

constantly determining the spacing between two extremes of the measured light and generating the control signal in response to the spacing exceeding a predetermined tolerance value.

7. The method of claim 1, and further comprising the steps of:

aligning the first and second light waveguides in a first direction perpendicular thereto; and aligning first and second light waveguides in a direction perpendicular thereto and in a direction perpendicular to the first direction, all prior to converging the two waveguides.

8. The method of claim 1, and further comprising the step of:

prior to converging, adjusting the spacing between the ends of the light waveguides before displacement.

9. The method of claim 1, and further comprising:

prior to converging, adjusting the spacing between the ends of the light waveguides to be in the range of from 5 to 25 $\mu$m.

10. The method of claim 1, wherein:

the step of moving at least one of the light waveguides toward the other is further defined as moving the light waveguide at a constant speed.

* * * * *